UNITED STATES PATENT OFFICE.

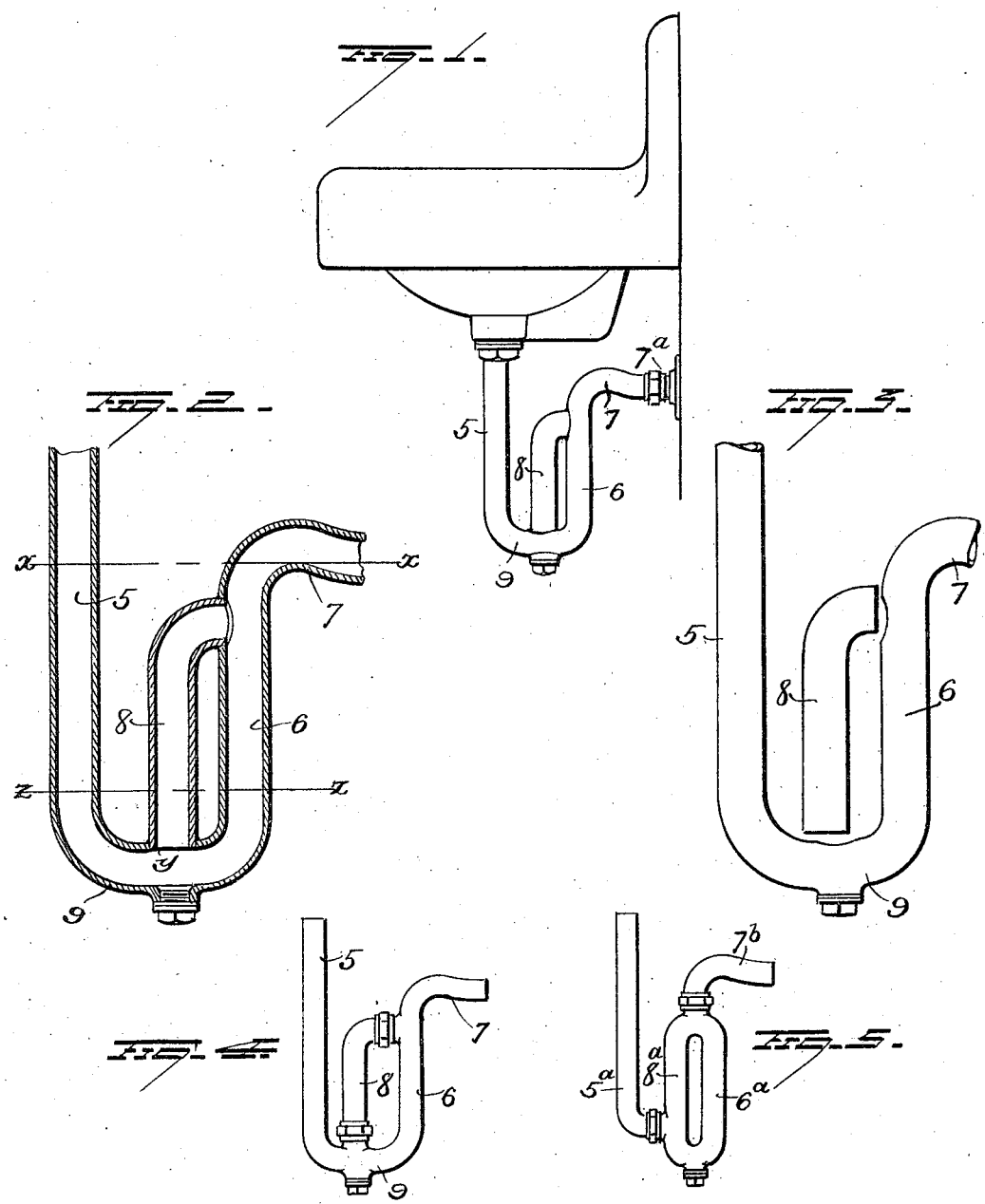

NORRIS C. LEONARD, OF BALTIMORE, MARYLAND.

SANITARY TRAP.

1,418,941.

Specification of Letters Patent. Patented June 6, 1922.

Application filed June 22, 1921. Serial No. 479,613.

*To all whom it may concern:*

Be it known that I, NORRIS C. LEONARD, a citizen of the United States, and a resident of Baltimore, in the county of Baltimore and State of Maryland, have invented certain new and useful Improvements in Sanitary Traps; and I do hereby declare the following to be a full, clear, and exact description of the invention, such as will enable others skilled in the art to which it appertains to make and use the same.

My invention relates to an improvement in sanitary traps for maintaining a water seal between a basin or other plumbing fixture and the water pipe to which the basin or other fixture is connected, and is designed as an improvement on the construction disclosed in U. S. Patent No. 1,375,598 granted to me April 19th, 1921.

In my patent above referred to, the trap is composed of two U-shaped sections each having one long and one short member, one of said sections being inverted and each having the free end of its shorter member in open communication with the bend of its companion member, the shorter member of the upright section or the section directly connected with the basin or other plumbing fixture, constituting in effect a reservoir which operates to automatically and instantly reseal the trap whenever the latter is emptied or partially emptied by suction or siphonage.

In the present invention I use simply one U-shaped section and connect the shorter member thereof below its top or discharge end, with the bend in said member, by a by-pass connection, the shorter member of said section and the by-pass both being open for the free passage of the water from the basin or other fixture, to the discharge or waste pipe, the shorter member of the section acting as a reservoir and holding sufficient water to reseal the trap in the event of suction or siphonage action in the discharge or waste pipe.

In the accompanying drawings, Figure 1 is a view of my improved trap applied to a waste basin; Figure 2 is a view in section through the trap; Figure 3 is a view of the trap sections before they are assembled and connected; Figure 4 is a view showing the by-pass pipe connected by screw couplings, and Figure 5 is a view similar to Figure 4 of another modification.

The trap consists of a pipe cast or bent into U-shape and having one long member 5 and one short member 6, the latter being bent at its upper end as at 7, in the usual and well known manner for its attachment to a discharge or waste pipe 7$^a$ leading to the sewer, and a by-pass pipe 8 connected at its upper end to the shorter member 6 below the bend 7 in the latter, and at its lower end to the bend or base 9 of the U section.

The by-pass 8 has free open communication throughout the diameter of its lumen with the shorter member 6, and also at the bend 9 in said U-shape section, so that water from a basin or tub entering the longer member 5 of the U-shape section, passes through and flushes alike the by-pass 8 and shorter member 6. Under ordinary conditions the pressure will be equal in the three pipes or chambers 5, 8 and 6 and the velocity of flow at the bend 7, which is the point of discharge from the shorter member 6, will be the same as the flow through the longer member 5.

When the trap is filled from the basin, the water level will be on the line $x$—$x$ of Figure 2. Should a negative pressure occur in the waste or discharge pipe 7$^a$ to which the upper end of the shorter member 6 is connected, sufficient to cause siphoning, air would enter the longer member 5 and force the column of water in advance of it with a piston like action until the point Y is reached; the air then, because of its lesser specific gravity, will enter the by-pass 8 carrying the water in the by-pass 8 upwardly, and escapes through the bent end 7 of the shorter member 6 of the trap, until equilibrium is re-established, after which the column of water in the shorter section 6 of the trap will gravitate back and reseal the latter about on the line $z$—$z$.

Should further siphonic action occur before the trap has been refilled from the basin or other fixture, an equal degree of vacuity occurs above the water level in member 6 and by-pass 8, and the air entering through member 5 forces back the water, which because of the difference in specific gravity will be directed into member 6. Should the action be violent enough to sweep some of the water up through the by-pass 8, it will be directed against the wall of member 6 opposite the upper end of the by-pass 8, and drop back into member 6 where it will be retained until the action ceases, after which it will flow into the bend 9 of the trap and reseal the ends of the pipes 5, 8 and 6.

The important feature of the improvement is in locating the upper end of the by-pass 8 in a plane below the bend 7 or discharge end of the shorter section 6 of the trap, so that any water forced out of the by-pass 8 by violent siphonic action, will strike the wall of member 6 opposite the upper open end of the by-pass and then drop into member 6 and allow the air behind it to escape through the discharge end of said shorter member.

Another feature of the present improvement is that the velocity of movement of the water at the bend or point 7, which is the point where grease would be most likely to accumulate, is precisely the same as if it were a simple one half S trap, and therefore no more liable to accumulate grease or glutinous materials than the latter. The other portion of the trap inner walls are what may be termed "wetted surfaces", and would not for this reason readily accumulate materials of the kind above referred to.

Instead of making the trap of a U-shaped section with a by-pass connecting the bend of the U with the shorter member of the latter as above explained, the same results may be accomplished by constructing the by-pass and the short member of the U in the form of an elongated O as shown in Figure 5.

In the latter construction one side member 8ª of the elongated O corresponds to the by-pass 8, and the other member 6ª to the shorter member 6 of the U-shaped section disclosed in Figures 1, 2, 3 and 4, the member 5ª corresponding to member 5 of the previous construction, connecting with member 8ª above the lower end of the latter, and the waste or discharge pipe 7ᵇ connected to the top bend of the O section at the top of the latter.

It is evident that other changes in the shape of the parts may be resorted to without departing from the spirit of the invention hence I would have it understood that I do not confine my invention to the construction as shown, but consider myself at liberty to make such changes as may fall within the spirit of the invention as above disclosed.

Having fully described my invention what I claim as new and desire to secure by Letters-Patent, is:—

1. A sanitary trap composed of an inlet pipe, and two communicating outlet pipes, one of said outlet pipes adapted for connection at its outlet end with a waste pipe and the other outlet pipe having connection at its upper end with said first outlet pipe at a point below the discharge end of the latter.

2. A sanitary trap composed of an inlet pipe and two outlet pipes connected adjacent their lower ends with the inlet pipe one of said outlet pipes having free connection with the other outlet pipe in a plane below the outlet or discharge end of the latter.

3. A sanitary trap composed of a U-shape pipe the outlet member of which is shorter than the inlet member, the outlet member being connected with the discharge or waste pipe, and a by-pass pipe connected with said U-shape pipe at the bend or base of the latter, and connected with the outlet member at a point below the outlet end of the latter.

4. A sanitary trap composed of an inlet pipe member, a connected outlet pipe member, the two members forming a U-shaped trap, and a third pipe member having free communication with said trap at the bend or lower end of the latter, and also with the outlet member in a plane below the upper discharge end of the latter, substantially as described.

In testimony whereof, I have signed this specification in the presence of two subscribing witnesses.

NORRIS C. LEONARD.

Witnesses:
JNO. C. ROTH, Jr.,
MILTON C. ZEILER.